United States Patent [19]

Baujat

[11] Patent Number: 4,891,494
[45] Date of Patent: Jan. 2, 1990

[54] PROCESS AND DEVICE FOR NARROW-GAP WELDING

[75] Inventor: Vincent Baujat, Manche, France

[73] Assignee: Etat Francais, Paris Armees, France

[21] Appl. No.: 146,106

[22] Filed: Jan. 20, 1988

[30] Foreign Application Priority Data

Jan. 29, 1987 [FR] France ................... 87 01043

[51] Int. Cl.⁴ .............................................. B23K 9/12
[52] U.S. Cl. ................................. 219/137.8; 219/136
[58] Field of Search ................. 219/74, 137 R, 137.8, 219/136

[56] References Cited

U.S. PATENT DOCUMENTS 1,571,924  2/1926  Kenyon .
3,567,900  8/1968  Nelson et al. .
3,576,966  5/1971  Sullivan ................... 219/137 R

FOREIGN PATENT DOCUMENTS 3136526   9/1981  Fed. Rep. of Germany .
2163435  10/1972  France .
2514280  10/1981  France .
0177965   9/1985  Japan ................... 219/137.8
1187363   3/1968  United Kingdom .

Primary Examiner—Clifford C. Shaw
Attorney, Agent, or Firm—Oliff & Berridge

[57] ABSTRACT

The invention concerns arc welding in a narrow gap. According to the invention, the tip (6) of the electrode wire cooperates with the wire guide tube to oscillate in a plane (P) perpendicular to the line of advance (D) and to either side of a median line (Ye) inclined at an angle (I) with respect to the centeline (Yg) of the wire guide tube, this oscillation being bounded alternately by the edge of one of the pieces and by the previous bead. The invention applies to arc welding with a consumable electrode under a protective atmosphere and in a narrow gap, in flat, vertical and overhead weld positions.

3 Claims, 5 Drawing Sheets

PROCESS AND DEVICE FOR NARROW-GAP WELDING

FIELD OF THE INVENTION

The invention relates to a narrow-gap welding process, and a device for using this process.

This invention applies to MIG arc welding techniques in protective gas atmosphere with consumable electrode, and more particularly to welding in a narrow gap in all positions (flat, vertical and overhead welding).

BACKGROUND OF THE INVENTION

Several welding processes are known, described for example in patents FR 2 514 280, and FR 2 163 435 or U.S. Pat. No. 3 567 900.

The first patent relates to a process for welding in a narrow gap with a preformed undulated wire, and a device for using this process. The advantage of this is that is avoids defects like a lack of fusion, the cause of these defects being the lack of mobility of the electrode tip.

This is because, considering the high ratio between the depth and width of the gap, the electrode holder cannot be inclined far enough to direct the electric arc toward the walls of the pieces to be welded. This produces areas of discontinuity or lack of material, and thereby an embrittlement of the assembly, which is harmful to good mechanical strength.

FIG. 1 is an illustration of this welding process. The electrode holder 1.1 is arranged between the two pieces to be welded 2A and 2B, and the electrode 4 deposits a weld bead 3. FIG. 1.A shows a lack of fusion defect, while FIG. 2 is a cross section of the known device described in document FR 2 514 280.

To remedy this disadvantage, one solution is given that consists of bending the electrode wire to a special preformed profile. This profile is obtained by plastic deformation. The wire comes out of the electrode holder in undulated form with a predetermined pitch and amplitude. The result is that the electrode tip oscillates as it is consumed. Whatever the application presented, this oscillation always goes alternately to one and then the other edge of the pieces to be welded, and to either side of a main centerline Yp, always parallel to the edge of one of the pieces or to the electrode holder centerline.

However, the major disadvantage of this solution is that it is not adapted to an overhead welding position.

This is because the geometry of a weld bead deposited in a gap is considered to be correct when the angle between the free surface of the bead and the edge of the piece is greater than 90°, as this allows a sufficient remelting of the bead by the following bead in later passes. However, in the solution presented, the combination of gravity and surface tensions in the pool of weld metal inevitably create a joint angle $\times$ less than 90° and thus an unacceptable geometry.

FIG. 2.B gives a representation of the result sought under conditions of overhead welding where the joining angle $\times$ is greater than 90°, while FIG. 2.A is a representation of the result obtained with this first solution, with a joining angle $\times$ that is then unacceptable. The result in FIG. 2.B is thus physically impossible to obtain with this process, as the weld bead is not in equilibrium.

The French patent 2 163 435 is for a process and electrode wire feed device.

The solution proposed in this process, illustrated in FIG. 3, is to curve the electrode wire in such a way that the electrode tip can be oriented in the direction of one of the pieces to be welded.

This tip is thus inclined with respect to the edge of one of the welding pieces in the plane P perpendicular to the line of advance D of the electrode holder 1.3, by an angle I which must be constant.

FIG. 3.A represents the result obtained with this process in a weld from underneath.

Its advantage is thus to allow the deposit of a weld bead with a pool geometry and size that are compatible with welding in all positions. However, the disadvantage of this process is that it never completely guarantees that there will be no lack of fusion type defect because the electrode tip cannot be held mechanically in a plane P perpendicular to the advance D.

This is because the residual internal stresses in the weld wire cause this wire to turn, oscillating about the main axis Yp.

This rotation R has the direct consequence of never guaranteeing the perfect perpendicularity of the plane P, defined by the tip of the electrode e and the axis Yp with respect to the line of advance D.

FIG. 3.B illustrates this disadvantage in a view from above.

FIG. 3.C is a perspective of the various planes and axes defined above.

The tip e adopts the positions e1 and e2 in succession and randomly during the welding operation, thereby defining planes P1 and P2 that are ill adapted to the need for perpendicularity of the plane P with respect to the line of advance D.

Patent DE 3 136 526 shows a narrow-gap welding device including an external additional motor for rotating a wire guide tube in order to oscillate the electrode wire. But this device requires an inclination of the wire guide tube, for depositing an angle bead, with the disadvantage of widening the gap or the reducing its depth. Moreover, the wire guide tube is curved, which increase its wear.

The purpose of the invention is thus to allow welding in all positions, while avoiding defects of the lock of fusion type, and ensuring simplified use of the wire guide tube.

SUMMARY OF THE INVENTION

The object of the invention is thus a process of welding by deposit of successive beads between the first piece and the second piece, facing each other and spaced apart by a narrow gap, using at least one electrode wire and at least one wire guide tube, wherein the tip of the electrode wire, in cooperation with the wire guide tube, oscillates in a plane perpendicular to its advance, and to either side of a median line inclined with respect to the main axis of the wire guide tube, while this oscillation is limited alternately from the edge of one of the pieces to the previous bead.

According to another feature of the invention, the electrode wire is fed out in the form of a periodic wave with a mean radius of curvature less than 0.4 m, with the period of the wave being less than 0.2 m.

This process offers numerous advantages.

It brings together the positive effects of the two known constructions previously mentioned: the wire oscillates from one edge of the piece to the previous bead and is held in a plane perpendicular to the line of advance of the torch in the same way as in the process of patent FR 2 514 280; but is lays a bead of geometry analogous to the one laid by the process in patent FR 2 163 435.

The process according to the invention thus makes it possible to weld in all positions, and without lack of fusion.

BRIEF DESCRIPTION OF DRAWINGS

The following description will reveal a nonlimiting embodiment of the invention, with reference to the appended drawing.

DETAILED DESCRIPTION OF PREFERRED EMBODIMENTS

Figure 1:
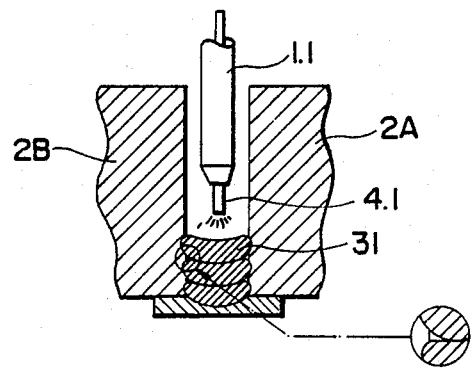
FIGS. 1 to 3 illustrate the known designs described above.
Figure 2:
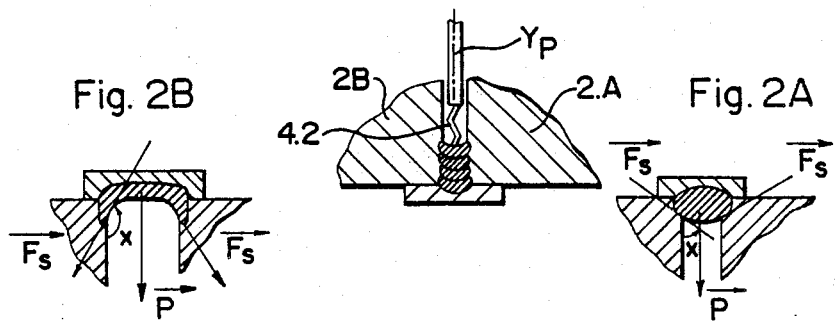
Figure 3:
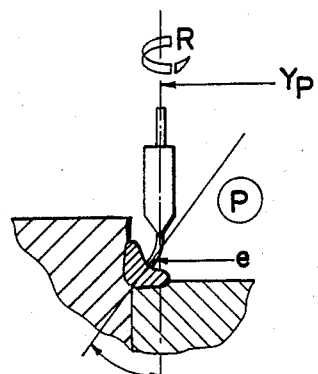
Figure 3A:
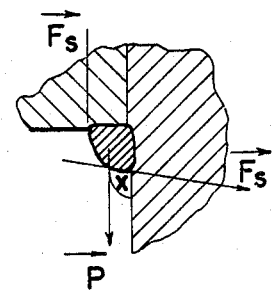
Figure 3C:
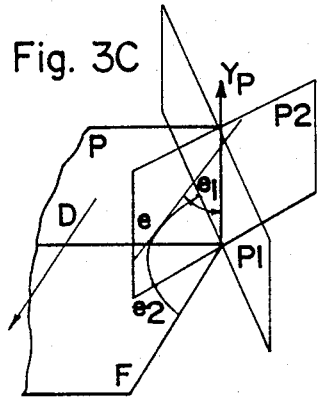
Figure 3B:
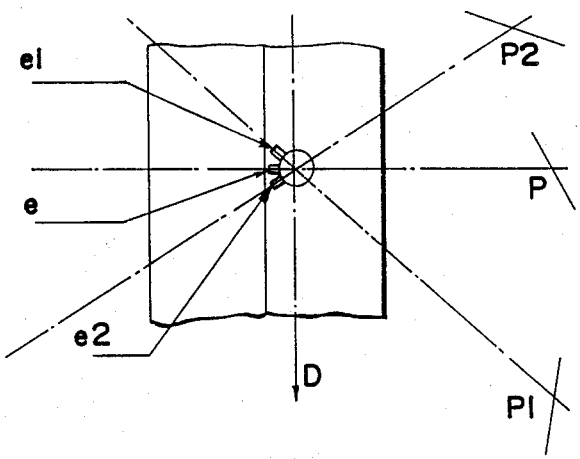
Figure 4:
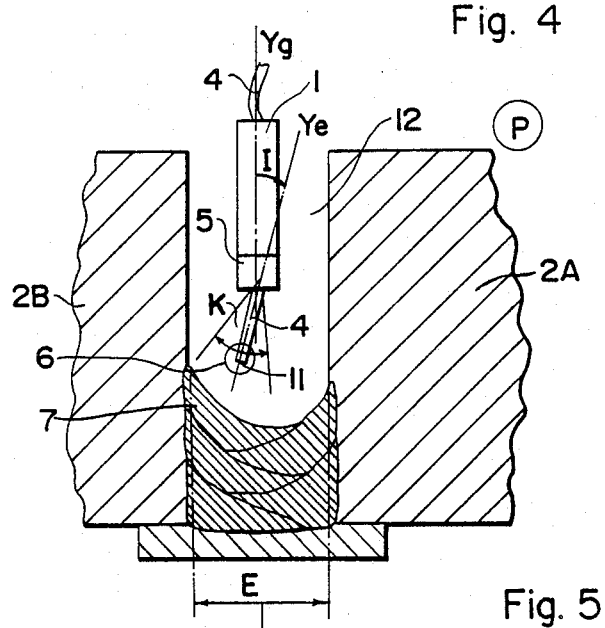
FIG. 4 is a cross-sectional view of the type of weld achieved by the process according to the invention.
Figure 5:
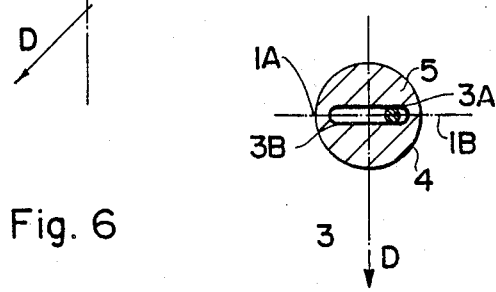
FIG. 5 is a cross-sectional view of the contact tube.

According to FIG. 4, the wire guide tube 1 is placed between the pieces to be welded 2A and 2B facing each other and spaced closely apart to minimize the duration of the welding operation, thereby forming a narrow gap 12 of width e;

At the end of wire guide tube 1 is fastened, conventionally, a contact tube 5 which, according to FIG. 5, has an oblong orifice 3 presenting two flat surfaces 3A and 3B parallel to each other and perpendicular to the line of advance D of the wire guide tube.

Figure 6:
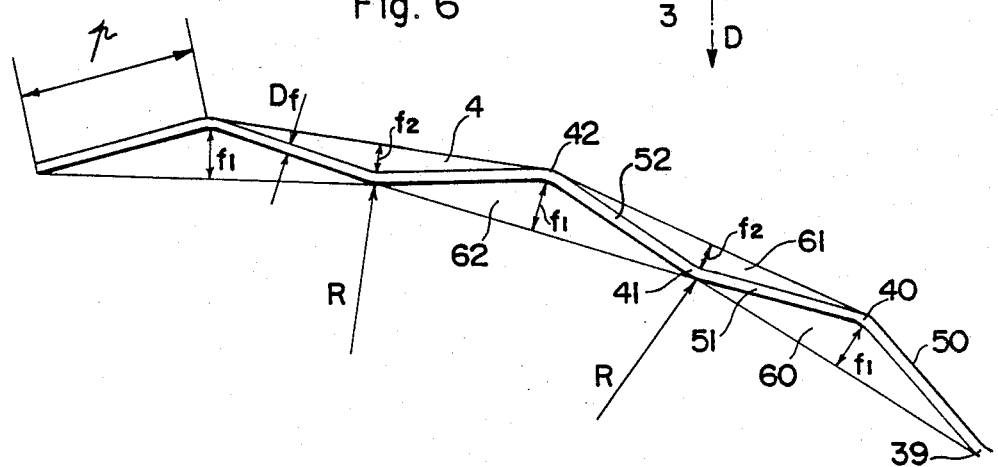
FIG. 6 is a side view of an electrode wire shaped by the process according to the invention, as it appears at the outlet from the contact tube in the absence of an electric power supply.

An electrode wire 4, shown in FIG. 6, is inserted in the wire guide tube and, during the welding operation, slides inside the oblong form of the contact tube.

This electrode wire, having a planar form, cooperates with the planes 3A and 3B of the contact tube, thereby holding the electrode tip in the oscillation plane P.

The electrode 4 receives electrical energy, originating from a conventional type power supply, through the contact tube 5.

In a known fashion, this energy generates an electric arc between the electrode tip 6 and the piece to be welded, thereby melting the material of the electrode and of the piece receiving the bead, so that the electrode deposits the melted material as it is consumed.

According to the invention, the electrode wire exhibits, at the ends of its straight parts (50, 51, 52, etc.), points (39, 40, 41, etc.) forming isosceles triangles (60, 61, 62, etc.) three by three and to either side of the electrode wire, each triangle consisting of a base and a height, where the height is called the deflection.

The electrode wire is designated so that it has a deflection f1 on one side and a deflection f2 on the other, with the two deflections being unequal. The wire therefore has a radius of curvature R on the side of the greater deflection.

As it is consumed, the tip of the electrode oscillates to either side of a line Ye due to its broken-line profile, with the line Ye being at a predetermined angle I with respect to the main centerline Yg of the wire guide tube by the radius of curvature R.

This oscillation goes between the edge of one piece to the previous bead, without reaching the edge of the opposite piece.

Due to the combined motion of advance D of the wire guide tube and of the oscillation of the electrode tip in a plane perpendicular to this advancing motion, a bead 7 is deposited between one of the two edges 2B or 2A of the pieces to be welded and the two previous beads.

Two or more wire guide tubes can be combined one after the other, each with its own electrode and power supply, though a single wire guide tube is typically enough; but a single tube would then have to make a 180° rotation about its Yg axis at the end of one run through the gap.

The beads deposited are of the corner bead type.

The geometry of these beads corresponds to the requirements of omniposition welding, and guarantees the absence of lack of fusion type defects, by the agitation of the molten pool, by the alternating motion from the edge of the piece to the previous bead and by the guidance of the contact tube.

For common welding operations under active or inert atmospheres, nozzles of appropriate geometry are introduced in the gap in front of and behind the tube, providing gas to protect the arc from the surrounding air and thereby providing the bead with good compactness.

The special profile of the consumable electrode is obtained by a device comprising a system of gears and an electrode guide upstream of the two gears.

Figure 7:
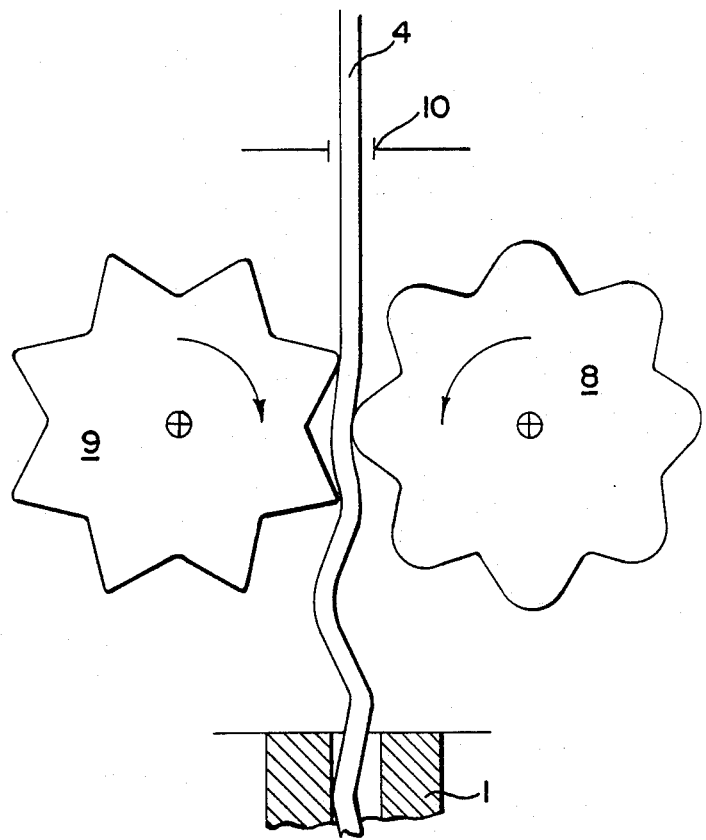
FIG. 7 is a diagram of the device used to implement the process.

FIG. 7 is an elevational view of this device.

This device allows the feeding of the electrode wire, as well as its plastic deformation. The electrode wire 4 is inserted through an inlet orifice 10 which directs it through two toothed wheels 8 and 9 forming a parallel-axis gear set whose rotation is synchronized by a conventional type drive device. The input orifice 10 offers a good lateral securing of the electrode wire and better efficiency of the forming device. It keeps the electrode wire from whipping under the alternate action of the teeth against it, thereby improving their hold on the wire and avoiding slippage.

Once it is formed, the electrode wire enters the wire guide tube and contact tube and then feeds out of this tube.

The gear rotation axes are perpendicular to the direction of arrival of the wire and their distance can be adjusted by a known screw-nut type device. The toothed wheels are positioned so that the teeth of the one mesh opposite the roots of the other while leaving a narrow space between for the wire to pass through. These toothed wheels are special in that they each present different profiles, so that two consecutive deflections on the same electrode wire are unequal. The distance between the axes of the toothed wheels varies with the engagement ENG of the gear assembly. This variation makes it possible to vary the deflections f1 and f2 of the electrode wire in order to modulate the amplitude k of the undulation. It is observed that this variation of the deflections is achieved at quasi-constant f1-f2, implying an almost null variation of R and thereby guaranteeing a constant position of the Ye axis in any case, according to the following formula obtained by approximation:

$$R = \frac{p2}{f1 - f2}$$

Figure 8:
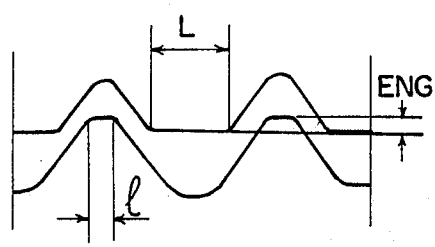
FIGS. 8 to 10 show several tooth profiles of the gears that can be used in the device according to the invention.
Figure 9:
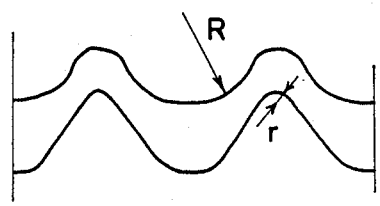
Figure 10:
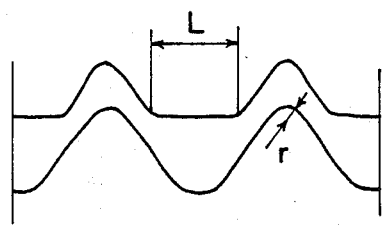

As a nonlimiting example, FIGS. 8 to 10 illustrate a series of profiles according to the invention.

FIG. 8 shows wheels that are truncated at their tips, thereby presenting lands of different lengths L and l. Designating by Df the diameter of the electrode wire, L may be between 0.5 Df and 20 Df and l may be between 0.1 Df and 3 Df.

FIG. 9 shows the profiles of two wheels with teeth rounded to different radii R and r, in which R can vary between 2 Df and 30 Df and r can vary between 0.1 Df and 3 Df.

FIG. 10 shows a combination of the two previous forms, with one profile rounded at a radius r of between 0.1 Df and 3 Df, and the other profile carrying a flat surface of a length L between 0.5 Df and 20 Df.

One preferred mode of construction of the device according to the invention presents the following values:

Weld gap e=10 mm
Diameter of electrode wire Df=1.2 mm
Length of each segment P=10 mm
Engagement distance ENG=1 mm
Deflection f1=1 mm
Radius r=1 mm (case of FIG. 10)
Oscillation angle $5° \leq I \leq 30°$.

The variation of the deflection f2 and of the radius of curvature R, in mm, as a function of the yield strength Re of the electrode wire and of the length L of the land are:

| L in mm | Re in Mpa | L of the land are: | | | | |
|---|---|---|---|---|---|---|
| | | 0.5 | 1 | 1.5 | 2 | |
| | 500 | 0.8 | 0.7 | 0.7 | 0.6 | f2 |
| | | 500 | 400 | 330 | 250 | 2R |
| | 700 | 0.8 | 0.8 | 0.7 | 0.7 | f2 |
| | | 600 | 450 | 360 | 290 | 2R |

I claim:

1. A process of electric welding comprising depositing successive beads between a first piece and a second piece facing each other and separated by a narrow gap using at least one electrode wire and one wire guide tube having an axis, by advancing said electrode wire in a direction of advance inside the gap, wherein a tip of said electrode wire, in cooperation with the wire guide tube, oscillates in a plane perpendicular to said direction of advance and to either side of a line in said plane and positioned at an angle with respect to the axis of the wire guide tube, the oscillation being bounded alternately by an edge of one of said pieces and a previously formed bead.

2. A process according to claim 1, wherein the electrode wire is in the form of a periodic wave having a mean radius of curvature less than 0.4 m and wherein the period of this wave is less than 0.2 m.

3. A process according to claim 1, wherein the wire guide tube comprises at a tip thereof a contact tube whose inside shape has at least two flat surfaces, the contact tube being arranged perpendicularly to said direction of advance, the contact tube guiding and holding the electrode wire in the plane of oscillation.

* * * * *